J. E. KENNEDY.
APPARATUS FOR CUTTING FRUIT, VEGETABLES, AND THE LIKE.
APPLICATION FILED NOV. 29, 1918.
1,395,425.
Patented Nov. 1, 1921.
3 SHEETS—SHEET 2.
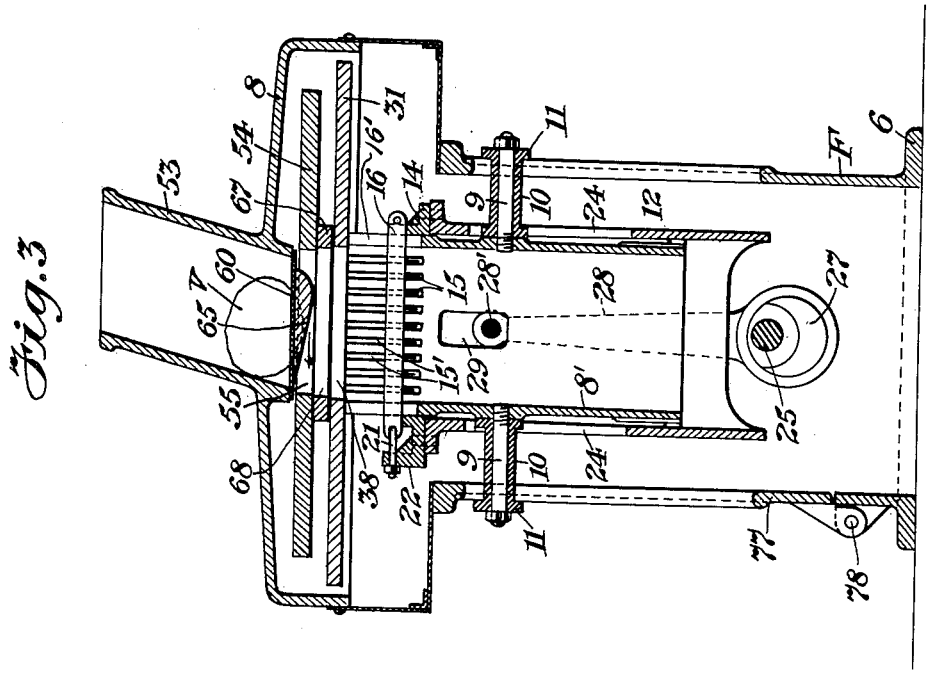
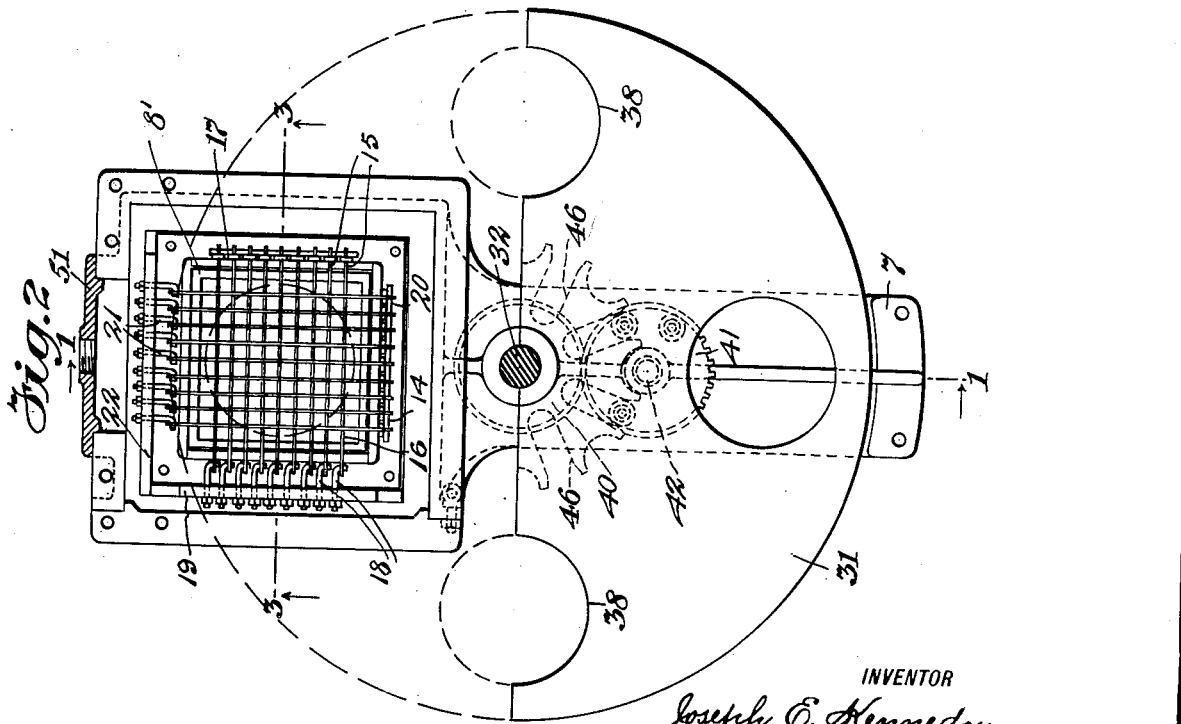
INVENTOR
Joseph E. Kennedy
BY
John O. Seifert
HIS ATTORNEY J. E. KENNEDY.
APPARATUS FOR CUTTING FRUIT, VEGETABLES, AND THE LIKE.
APPLICATION FILED NOV. 29, 1918.

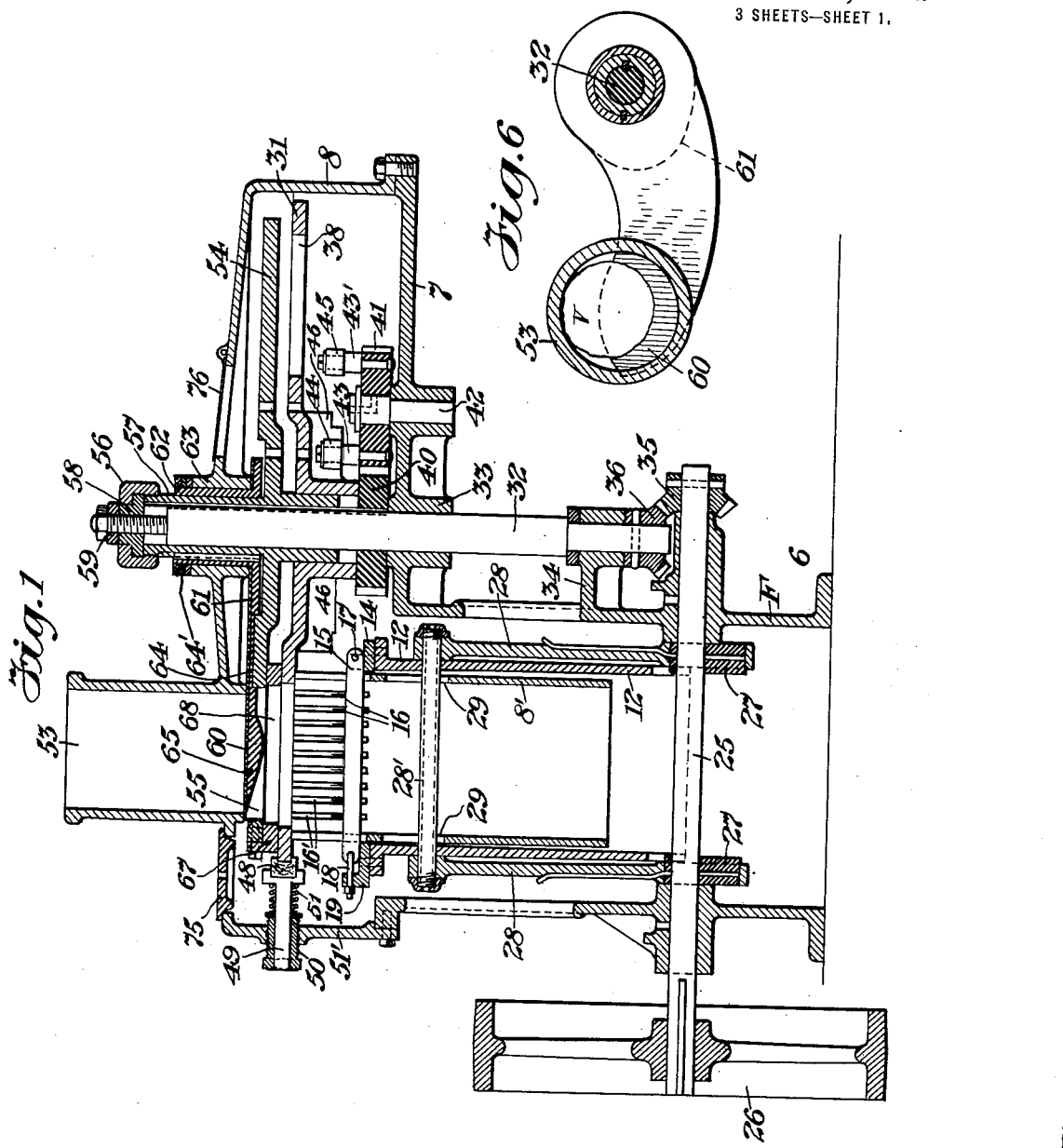

1,395,425.

Patented Nov. 1, 1921.
3 SHEETS—SHEET 3.

INVENTOR
Joseph E. Kennedy
BY
HIS ATTORNEY

UNITED STATES PATENT OFFICE.

JOSEPH E. KENNEDY, OF NEW YORK, N. Y.

APPARATUS FOR CUTTING FRUIT, VEGETABLES, AND THE LIKE.

1,395,425.

Specification of Letters Patent.   Patented Nov. 1, 1921.

Application filed November 29, 1918.   Serial No. 264,494.

*To all whom it may concern:*

Be it known that I, JOSEPH E. KENNEDY, a citizen of the United States, and a resident of the borough of Manhattan, in the city, county, and State of New York, have invented new and useful Improvements in Apparatus for Cutting Fruit, Vegetables, and the like, of which the following is a specification.

This invention relates to apparatus for cutting fruit, vegetables and the like preparatory to dehydrating the same and for other purposes, and it is an object of the invention to provide apparatus of this character which is novel and simple in construction and highly efficient in operation.

It is a further object of the invention to provide in apparatus of this character changeable and adjustable cutter mechanism whereby to cut fruit or vegetables in slices of variable thickness, and to cut the slices into strips, or into rectangular or cubiform parts.

In the drawings accompanying and forming a part of this specification, Figure 1 is a sectional elevation taken on the line 1—1 of Fig. 2 looking in the direction of the arrows.

Fig. 2 is a plan view partly in section and a portion of the framework removed to more clearly illustrate certain parts of the invention.

Fig. 3 is a sectional elevation taken substantially on the line 3—3 of Fig. 2 looking in the direction of the arrows.

Fig. 6 is a plan view of cutter means.

Similar characters of reference designate like parts throughout the different views of the drawings.

Figure 4:
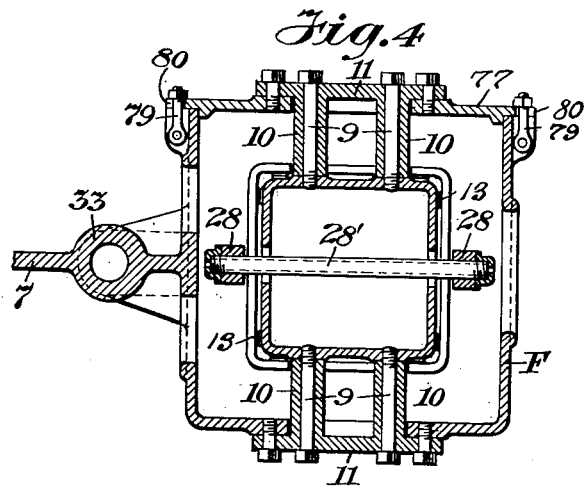
Fig. 4 is a sectional plan view taken substantially on the line 4—4 of Fig. 5.
Figure 5:
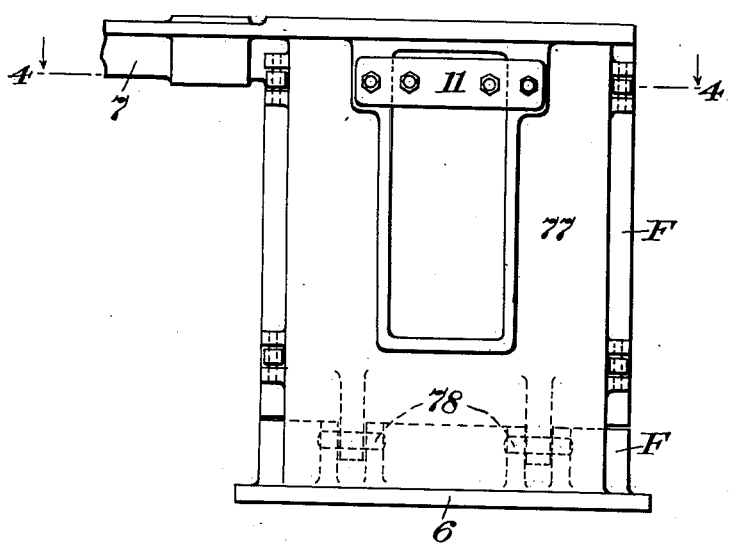
Fig. 5 is a side elevation of the supporting frame or standard to illustrate the manner of removably supporting one side thereof.

In the embodiment of the invention shown in the drawings the operative parts are carried by a hollow base or standard (designated in a general way by F), having a lateral flange 6 at the bottom to secure the same to a suitable foundation or support, and a lateral flange 7 at the top to removably support a housing 8.

A cage or tubular member 8' square or of rectangular shape in cross section is supported in fixed position within the base to extend in a vertical direction by screws or bolts 9 tapped into said cage passing through arms 10 of brackets 11 bolted to the standard and passing through openings in opposite sides of the standard. A frame 12 slidably engages over the cage 8' to have reciprocatory movement longitudinally of such cage, the outer surface of the cage having longitudinal ribs with which ribs on the inner surface of the frame are adapted to contact, as shown at 13, Fig. 4, to reduce the frictional resistance to the movement of the frame.

Mounted upon the upper flange of the frame is a carrier 14 for a series of cutters comprising a set of blades 15 extending transversely of the frame in parallel and spaced relation, and a set of blades 16 superposed to the blades 15 also extending in parallel and spaced relation transversely of the frame and transversely to the blades 15. The opposite ends of the blades 15 are seated in slots in upwardly extending flanges of the carrier and are maintained in rigid position therein by a rod 17 passing through a perforation in one end of each of the blades 15 engaging in back of a slotted flange of the carrier, and tie bolts 18 having a part to engage in perforations in the opposite ends of the blades, said bolts passing through openings in a flange 19 of the carrier and secured therein by nuts threaded on the ends of said bolts, said bolts also operating to draw the blades taut. The blades 16 are mounted in slots in upwardly extending flanges of the carrier 14 and retained rigidly therein by a rod 20 passing through perforations in one end of said blades engaging in back of one of the flanges and tie bolts 21 engage in perforations in the opposite ends of the blades and pass through openings in a flange 22 similarly to the blades 15. The upper end of the cage 8' projects beyond the blade carrier 14 and has slots 15' cut through the end of opposite walls in which the blades 15 slidably engage, and slots 16' in opposite walls in which the blades 16 slidably engage. To permit of reciprocatory movement of the frame 12 longitudinal slots 24 are provided in opposite walls of the frame for the passage of the bolt carrying arms 9 of the brackets 11.

The frame 12 with the blade carrier 14 is reciprocated from a main driving shaft 25 journaled in the lower part of the standard F and shown as driven from a suitable source of power by a belt passing around a pulley 26 secured to a projecting end of the shaft. The frame is operatively connected to and reciprocated from the shaft by eccentrics 27 fixed on the shaft and rods 28 having an opening at one end for mounting upon the eccentrics, and the opposite ends of the rods connected to the ends of a gudgeon pin 28' extending transversely of the frame and through slots 29 in the cage 8'.

A platen 31 in the form of a rotatable circular table is mounted on a vertical shaft 32 rotatably mounted in a bearing in a boss 33 and the lower end shouldered and rotatably supported in a bearing in a lug 34 extending from the standard F. The shaft 32 is driven from the shaft 25 by a bevel pinion 35 fixed to said latter shaft meshing with a pinion 36 fixed to the end of the shaft 32. The platen is arranged to overlap the slotted end of the cage 8' with the lower face thereof contiguous thereto, and is provided with a series of equidistantly spaced and circularly arranged openings 38, in the present instance being four in number, which are adapted to be placed intermittently and alternately with a portion of the platen between the openings in line or register with the cage and the cutters carried thereby.

To intermittently rotate the platen or table 31 there is mounted on the shaft 32 to rotate therewith a gear 40 which meshes with a pinion 41 rotatably mounted on a stud 42 secured in the flange 7 of the framework. The pinion 41 has a pair of shouldered studs 43, 43' secured therein to project up therefrom, said studs being located eccentric to the axis of rotation of the pinion and diametrically opposite to each other. The studs carry rollers 44, 45, which rollers during the rotation of the pinion are adapted to engage in and move out of radial slots or recesses 46 provided in the enlarged portion of the hub of the platen, or these recesses may be formed in a wheel fixed to the hub of the platen, thereby intermittently rotating the platen one-eighth of a revolution or forty-five degrees and causing the openings 38 in the platen and a portion of the platen between the openings to be placed in line or register with the cage 8' and the cutter blades mounted for movement therein. The platen is held against rotation during the intervals of rest by a shoe 48 frictionally and yieldingly engaging the periphery of the platen. This shoe is carried by an arm 49 slidably mounted in a sleeve 50 to have movement toward and away from the periphery of the platen, and yieldingly urged toward the platen by a spring 51 coiled about the arm and confined between the sleeve and the carrier for the shoe connected to the arm. The sleeve 50 is screw threaded into a plate 51' removably secured to the framework and is in the nature of a cover for a hand hole whereby access may be had to the mechanism inclosed by the housing 8. It will be obvious that the pressure with which the shoe bears against the periphery of the platen may be increased or decreased by screwing the sleeve 50 inward or outward and thereby increasing and decreasing the pressure of the spring 51. The vegetables or other articles to be cut by the cutter blades 15, 16, which are preferably sliced by means to be hereinafter described, are fed through the openings 38 in the platen to the blades in the cage 8', and the portions of the platen between the openings serve as a support against which the vegetables abut while being cut by the blades 15, 16, and the movement of the platen is so timed relative to the reciprocations of the blade carrier 12, 14 that as the blades move away from the platen the platen will be moved and brought to rest with an opening therein in alinement with the cage, and as the blade carrier moves toward the platen the platen will be moved and brought to rest with a portion of the platen between the openings in register or alinement with the cage.

As stated it is an object of the invention to cut sliced vegetables into strips or cubiform parts. For this purpose there is provided a holder for the vegetables comprising a tubular member 53 carried by the housing 8 to project up from the upper wall and having a part to extend below the inner surface of said wall and located in alinement with the cage 8'. This holder may be constructed integral with the housing, or it may be constructed separate therefrom and secured to the housing. The vegetable is supported in the holder with a portion projecting from the lower end of the thickness of the slice to be cut from the vegetable by a disk 54 mounted upon the shaft 32 to rotate therewith and interposed between the holder 53 and platen 31. The disk has an opening 55 which is adapted to intersect the openings in the platen and the holder. The disk is mounted in fixed spaced relation to the platen by a flanged nut 56 threaded on to the extended hub 57 of the disk, and said nut 56 being seated on the annular flange of a nut 58 threaded onto the reduced end of the shaft 32 and passing through an opening in the nut 56 and locked in position by jam nuts 59.

A revoluble knife or cutter 60 to slice the portion of the vegetable projecting from the holder, and which is preferably of the form shown in Fig. 6, is carried by an arm 61 extending over the disk opening. The arm extends radially from a hub 62 whereby it is mounted upon the extended hub 57 of the disk and rotatably engages in a bearing 63 of the housing 8. The arm is adjustably supported by a nut 64' threaded onto the end of the arm hub 62 and resting upon the end of the hub 63. The arm extends radially of the disk and engages in a slot in the face of the disk, as shown at 64, Fig. 1, in line with the opening 55 in the disk and has a portion 65 of suitable shape, and shown as of bulbous form, to engage in the disk opening 55, the said knife and bulbous arm being so arranged that as a slice is being cut by the knife from a vegetable in the holder the portion 65 will guide the slice into the disk opening. To lock the knife carrying arm to the disk to rotate in unison therewith the hub of the arm is keyed to the hub of the disk. The knife during the cutting operation is adapted to have a sliding contact with the end of the holder projecting below the housing 8 facilitating the making of a keen cut which is necessary when cutting delicate vegetables, and for cutting thin slices, and by adjustably supporting the knife carrying arm by the nut 64' the knife may be readily adjusted to compensate for wear or otherwise.

To prevent the severed slice from escaping between the disk 54 and table 31 there is provided a spacing block 67 having an opening 68, which block is removably secured to the disk to be interposed between the disk and platen with the opening therein in line with the opening in the disk. The opening in the block is larger than the opening in the disk and smaller than the openings in the platen, and the opening in the disk is larger than the holder but smaller than the opening in the block for a purpose to be hereinafter described.

To prevent movement of the vegetable in the holder during the slicing thereof and thereby facilitate the cutting the holder is arranged so that the inner walls thereof are inclined at an acute angle relative to the upper face of the cutter or knife and inclining in the direction of the movement of the knife, as shown in Fig. 3. By this arrangement as the cutting edge of the knife enters the vegetable the vegetable will be impinged against the forward inclined inner wall of the holder and the inclination of the wall will tend to firmly hold the vegetable. To facilitate lubricating of the bearings, or getting access to the same, the housing 8 is provided with openings normally closed by covers, as shown at 75 and 76.

In operation the vegetables, fruit or the like V to be cut are placed in the holder 53, the lowermost vegetable in the holder, when more than one is placed therein, being supported upon the disk 54 during the revolving movement thereof and until the knife begins to move across the end of the holder and begins to cut a slice. When the knife is in this position the mechanism is so timed that the platen is at rest and an opening 38 therein is in line with the cage 8' and the holder. As the slice is cut it is directed by the portion 65 of the knife carrying arm through the opening 55 in the disk and into the opening in the spacing block 67, and through an opening of the platen in register with the cage 8' into the cage upon the blades 15, 16, the blades at this time receding or having receded from the platen. After the delivery of the cut slice to the blades the platen is given a one-eighth turn causing a portion of the platen between the openings therein to aline with the cage. Simultaneously with the movement of the platen the blades 15, 16 are moved toward the platen and as the latter comes to rest the cut slice will be abutted, or be impinged, by the blades 16 against the platen, said blades being forced therethrough to cut the slice into a plurality of strips, and which strips will be forced between the blades 16 to lie contiguous to the cutting edge of the blades 15. Upon the cutting of the next slice the previously cut strips resting upon the cutting edge of the blades 15 are forced by the succeeding strips against the blades 15 cutting such strips into a plurality of parts of substantially cubiform, which parts fall down through and are guided by the cage to a suitable receiver for the same. By increasing the size of the openings in the disk, spacing block and platen, respectively, and making the cage slightly larger than the openings in the platen the delivery of the cut slices to the blades 15, 16 is greatly facilitated and prevents a cut slice from being lodged in any of said openings.

By mounting the disk 54 by the nuts 56, 58 said disk may be adjusted in an axial direction, or toward and away from the holder 53, to increase or decrease the space between the holder and disk to permit portions of a vegetable or the like of variable size to project from the holder as it is supported by the disk and thereby regulate the thickness of slices to be cut. In the adjustment of the disk spacing blocks of different thickness are provided to be utilized in accordance with the distance of the space between the disk and platen; or the spacing block may be built up of shims and one or more shims taken off in accordance with the adjustment of the disk.

As stated the apparatus is adapted to cut fruit, vegetables and the like into slices, which may be cut very thin, as when slicing potatoes for what are commonly termed "Saratoga chips," or thick and then cutting the slices into strips as when potatoes are to be used for what is termed "French fried potatoes," or to cut the slices into cubiform parts when it is desired to dehydrate the same. When it is desired to only cut slices the blades 15 and 16 are removed. To cut the slices into strips either of the sets of blades 15, 16 may be used, preferably the set 15, and to cut the slices into cubiform parts both sets of blades 15, 16 are used as heretofore explained.

To remove and replace the blades 15, 16, and to facilitate the cleaning of the blades as well as the cage and blade carrier, one side of the standard or base, as 77, is hingedly supported at the lower end, as at 78, to swing outward from the base. To remove or replace the blades the cage supporting bolts 9 are released from the cage when the cage is lowered to be supported upon the gudgeon pin 28′ of the blade carrier and the blade carrier with the blades and cage may be swung on the shaft 25 as an axis so that the upper end of the blade carrier with the blades and the cage extends from the side of the base normally closed by the side 77. The side 77 is secured in closed position by eyebolts 79, 79 pivotally carried by the standard and adapted to be passed through slots 80 of the side and having nuts threaded onto the said bolts outside of the side 77.

Variations may be resorted to within the scope of the invention, and portions of the same may be used without others.

Having thus described my invention, I claim:

1. In a vegetable cutter and the like, the combination of a holder for the vegetable, means to cut succesisve slices from the vegetable, a series of parallel and spaced apart cutters to which the slice is delivered as it is cut from the vegetable to cut the successive slices into a plurality of strips, a second series of parallel and spaced apart cutters and extending transverse to the first series of cutters to which the cut strips are delivered as they are cut to cut the strips into cubiform parts, and means to move the cutters to cut the slice into strips and cubiform parts transverse to the movement of the slicing cutter to cut the slice in the manner and for the purpose specified.

2. In a vegetable cutter and the like, the combination of a holder for the vegetable; a rotatable cutter to successively cut slices from the vegetable; a series of parallel and spaced blades to which the slices are delivered as they are sliced from the vegetable to cut the slices into a plurality of strips; a carrier to support said blades to extend parallel with the plane of movement of the slicing cutter and reciprocable in a direction transverse to the movement of the slicing cutter; and means to reciprocate said carrier.

3. In a cutter for vegetables and the like, cutters comprising a set of parallel and spaced apart blades, and a second set of parallel and spaced apart blades extending transverse to the first blades, toward which the cutters are movable, a platen in juxtaposed relation to the blades; and means to move the two sets of blades simultaneously toward and away from the platen for the purpose specified.

4. In a cutter for vegetables and the like, means to slice the vegetable, cutters to which the sliced vegetable is delivered, comprising a set of parallel and spaced blades, and a second set of parallel and spaced apart blades extending transverse to the first set of blades, means to move said two sets of blades in a direction transverse to the movement of the slicing means, and a platen toward which the two sets of blades are movable to coöperate with said blades for the purpose specified.

5. In a vegetable cutter and the like, the combination of a fixed tubular holder for the vegetable; means to support a vegetable in the holder with a portion projecting from one end of the holder; and a cutter to slice the portion of the vegetable projecting from the holder from the vegetable, said cutter being arranged to contact with the holder during the cutting operation, and said support being adjustable toward and away from the holder to cut slices of different thickness.

6. In a cutter for vegetables and the like, the combination of a tubular holder for the vegetable; means to support a vegetable in the holder with a portion projecting from one end of the holder; a rotatable cutter to slice the portion of the vegetable, projecting from the holder from the vegetable, said cutter being arranged to contact with the holder during the cutting operation; the inner walls of said holder inclining at an acute angle to the face of the cutter and in the direction of movement of the cutter and means to adjust the support toward and away from the holder for the purpose specified.

7. In a cutter for vegetables and the like, the combination of a tubular holder for the vegetable; a rotatable disk having an opening to support a vegetable in the holder with a portion projecting therefrom; and a cutter rotatable with the disk interposed between the disk and holder to cut a slice from the projecting portion of the vegetable and arranged to direct the cut slice through the opening in the disk.

8. In a cutter for vegetables and the like, the combination of a tubular holder for the vegetable; a rotatable disk having an opening to support a vegetable in the holder with a portion projecting therefrom; a cutter rotatable with the disk with the cutting edge in line with the opening in the disk to cut a slice from the projecting portion of the vegetable, and said cutter adapted to have sliding contact with the end of the holder during the cutting operation; and an arm interposed between the cutter and disk having a part to engage in the opening in the disk to guide the slice as it is cut through the opening in the disk.

9. In a cutter for vegetables and the like, the combination of a tubular holder for the vegetable; a rotatable disk having an opening to support a vegetable in the holder with a portion projecting therefrom; a knife rotatable with the disk interposed between the disk and holder to cut a slice from the projecting portion of the vegetable and arranged to direct the cut slice through the opening in the disk; and means to which the slice as it is cut is delivered operable to cut said slice into a plurality of parts.

10. In a cutter for vegetables and the like, the combination of a tubular holder for the vegetable; a rotatable disk having an opening to support a vegetable in the holder with a portion projecting therefrom; a cutter rotatable with the disk with the cutting edge in line with the opening in the disk to cut a slice from the projecting portion of the vegetable, and said cutter adapted to have sliding contact with the end of the holder during the cutting operation; an arm interposed between the cutter and disk having a part to engage in the opening in the disk to guide the slice as it is cut through the opening in the disk; and means to which the slice as it is cut is delivered operable to cut said slice transversely into a plurality of parts.

11. In a cutter for vegetables and the like, the combination of a tubular holder for the vegetable; a rotatable disk having an opening to support a vegetable in the holder with a portion of the vegetable projecting therefrom; a knife rotatable with the disk interposed between the disk and holder to cut a slice from the projecting portion of the vegetable and arranged to direct the cut slice through the opening in the disk; cutters in line with the holder and with which the opening in the disk is adapted to aline when a slice is cut from the vegetable and to which the cut slice is delivered; and an intermittently movable platen having a series of openings one of which openings is adapted to be placed in register with the disk opening and cutters as the slice is cut from the vegetable and through which the cut slice is delivered to the cutters, and a portion of the platen between the openings being adapted to register with the cutters during the non-cutting movement of the slicing knife and against which the slice abuts as it is being cut by the cutters.

12. In a cutter for vegetables and the like, the combination of a tubular holder for the vegetable, a rotatable disk having an opening to support a vegetable in the holder with a portion projecting therefrom; a knife rotatable with the disk with the cutting edge in line with the opening in the disk to cut a slice from the projecting portion of the vegetable, and said knife adapted to have sliding contact with the end of the holder during the cutting operation; an arm interposed between the knife and disk having a part to engage in the disk opening to guide the slice as it is cut through the opening; reciprocable cutters in line with the holder and with which the opening in the disk is adapted to aline when a slice is cut from the vegetable; and an intermittently movable platen having a series of openings to be alternately placed in register with the opening in the disk and cutters as a slice is cut from the vegetable and through which the cut slice is delivered to the cutters, and a portion of the platen between the openings being alternately placed in register with the cutters during the non-cutting movement of the knife and against which the slice abuts during the cutting operation of the cutters.

13. In a cutter for vegetables and the like, the combination of a holder for the vegetable; means to cut successive slices from the vegetable in the holder; and cutters reciprocable transversely to the movement of the slicing cutter and to which the slices are delivered as they are cut by the slicing cutter to cut the slices into a plurality of parts.

14. In a cutter for vegetables and the like, the combination of a holder for the vegetable; a rotatable knife to cut slices successively from the vegetable in the holder; cutters reciprocable transversely to the movement of the slicing cutter to cut the slices into a plurality of parts; a platen having a series of openings; and means to intermittently move said platen to cause an opening in the platen to register with the cutters to deliver a slice therethrough to the cutters as it is cut by the rotatable knife and to cause a portion of the platen between the openings to register with the cutters against which the cut slice abuts during the cutting thereof by the cutters.

15. In a cutter for vegetables and the like, the combination of a holder for the vegetable; a knife to cut successive slices from the vegetable in the holder; a rotatable carrier for said knife, said carrier being adjustable to regulate the thickness of the slice cut; and cutters reciprocable transversely to the movement of the slicing knife to which the slice is delivered as it is cut by the slicing knife to cut the slices into a plurality of parts.

16. In a cutter for vegetables and the like, the combination of a holder for the vegetable; a rotatable knife to cut successive slices from the vegetable in the holder; a cage into which the cut slice is delivered as it is cut by the knife; and cutters reciprocable in said cage in a direction transverse to the cutting movement of the knife to cut the slice delivered into the cage into a plurality of parts.

17. In cutters for vegetables and the like, the combination of means to cut slices successively from the article to be cut, and means to which the successive slices are delivered to cut the slices into a plurality of parts, comprising a plurality of substantially parallel and spaced apart cutters, means to reciprocate the cutters, and a platen against which the slice abuts as it is being cut by the cutters.

18. In cutters for vegetables and the like, the combination of means to cut successive slices from the article to be cut, and means to which the successive slices are delivered as they are sliced from the article to cut the slices into a plurality of parts, comprising a plurality of substantially parallel and spaced apart cutters, and a platen to coöperate with the cutters during the cutting of the slices for the purpose specified.

19. In cutters for vegetables and the like, the combination of means to cut successive slices from the article to be cut, and means to which the successive slices are delivered as they are sliced from the article to cut the slices into a plurality of parts, comprising a set of substantially parallel and spaced apart cutters, a second set of substantially parallel and spaced apart cutters, said latter cutters extending transversely to the first set of cutters, and a platen to coöperate with the cutters during the cutting of the slices for the purposes specified.

20. In a cutter for vegetables and the like, the combination of a platen having a series of openings therein; reciprocable cutters movable toward and away from the platen; means to intermittently move the platen whereby as the cutters move away from the platen an opening therein will be in line with the cutters and as the cutters move toward the platen a portion of the platen between the openings will be in line with the cutters; and means to cut a slice from a vegetable and deliver it through an opening in the platen in line with the cutters.

21. In a cutter for vegetables and the like, the combination of an intermittently movable platen having a series of openings therein; a series of substantially parallel blades; means to move said blades toward and away from the platen, the movement of said blades being timed relative to the movement of the platen whereby as the blades move away from the platen an opening in the platen will be in line with the blades, and as the blades move toward the platen a portion of the platen between the openings will be in line with the blades; and means to slice a vegetable and deliver the slices as they are cut through the openings in the platen in line with the blades.

22. In a cutter for vegetables and the like, reciprocable cutters; a platen intermittently movable across the cutters, said platen having a series of openings through which the vegetables to be cut are fed to the cutters, the movement of said platen and cutters being so timed whereby as the cutters move toward the platen a portion of the platen between the openings will be in line with the cutters and as the cutters move away from the platen an opening in the latter will be in line with the cutters.

23. In a cutter for vegetables and the like, reciprocable cutters; a platen intermittently movable across the cutters, said platen having a series of openings through which the vegetables to be cut are fed to the cutters, the movement of said platen and cutters being so timed whereby as the cutters move toward the platen a portion of the platen between the openings will be in line with the cutters and as the cutters move away from the platen an opening in the latter will be in line with the cutters; and means to cut slices successively from a vegetable and deliver the successive slices as they are cut through an opening in the platen in line with the cutters.

24. In a cutter for vegetables and the like, reciprocable cutters; a rotatable platen relative to which the cutters are reciprocable and having a series of openings through which the vegetables to be cut are fed to the cutters; means to intermittently rotate the platen to aline an opening therein with the cutters as the latter move away from the platen and aline a portion of the platen between the openings with the cutters as the latter move toward the platen.

25. In a cutter for vegetables and the like, a reciprocable tubular frame; blades carried at one end of said frame to extend transversely thereof in parallel and spaced relation; a fixed cage to guide the frame, said cage having slots cut through one end in which the blades slidably engage; and an intermittently rotatable platen to lie contiguous to the end of the cage having a series of openings through which the vegetables to be cut are fed to the blades in the cage, the movement of said platen being timed relative to the movement of the blade carrying frame whereby an opening in the platen will be in line with the cage and cutters as the cutters move away from the platen and a portion of the platen between the openings will be in line with the cage and cutters as the cutters move toward the platen.

26. In a cutter for vegetables and the like, a reciprocable tubular frame; blades carried at one end of said frame to extend transversely thereof in parallel and spaced relation; a fixed cage to guide the frame in its movement, one end of said cage extending beyond the frame and having slots cut through said end for the engagement of the blades; a rotatable platen to lie contiguous to the slotted end of the cage having a series of openings through which the vegetables to be cut are fed to the cage and cutters; and means to intermittently rotate the platen to alternately aline an opening therein and a portion between the openings with the end of the cage for the purpose specified.

27. In a cutter for vegetables and the like, a reciprocable tubular frame; blades carried at one end of said frame to extend transversely thereof in parallel and spaced relation; a fixed cage to guide the frame in its movement, one end of said cage extending beyond the frame and having slots cut through said end for the engagement of the blades; a rotatable platen to lie contiguous to the slotted end of the cage having a series of openings through which the vegetables to be cut are fed to the cake and cutters; means to intermittently rotate the platen to alternately aline an opening therein and a portion between the openings with the end of the cage; and means to cut slices successively from a vegetable and deliver the successive slices as they are cut through the openings in the platen into the cage to the cutters for the purpose specified.

28. In a cutter for vegetables and the like, a tubular frame; two sets of blades carried at one end of said frame to extend transversely thereof in parallel and spaced relation and one set extending transversely of the other set; means to reciprocate said blade carrying frame; a fixed cage to engage in and guide the frame in its movement, one end of said cage extending beyond the frame and having slots cut through the end in which the respective sets of blades slidably engage; a rotatable platen to lie contiguous to the slotted end of the cage and having a series of openings through which to feed the vegetables to the cage and cutters; and means to intermittently rotate the platen to alternately place an opening thereof and a portion of the platen between the openings in line with the cage and cutters for the purpose specified.

29. In a cutter for vegetables and the like, reciprocable cutting means; a rotatable platen toward and away from which the cutting means is movable, said platen having a series of openings through which the vegetables are fed to the cutters; means to intermittently rotate said platen to alternately place an opening therein and a portion between the openings in line with the cutters; and means to hold the platen against movement during the periods of rest.

30. In a cutter for vegetables and the like, reciprocable cutting means; a circular platen rotatable transversely of the cutting means, said platen having a series of openings through which the vegetables to be cut are fed to the cutters; means to intermittently rotate the platen to alternately place an opening therein and a portion between the openings in line with the cutters; and a shoe to yieldingly engage the periphery of the platen to hold the same against movement during the periods of rest.

31. In a cutter for vegetables and the like, reciprocable cutting means; a circular platen rotatable transversely of the cutting means, said platen having a series of openings through which the vegetables to be cut are fed to the cutters; means to intermittently rotate the platen to alternately place an opening therein and a portion of the platen between the openings in line with the cutters; a shoe to yieldingly engage the periphery of the platen to hold the same against movement during the periods of rest of the platen; and means to successively cut slices from a vegetable and deliver the slices so cut through an opening in the platen to the reciprocable cutting means.

32. In a cutter for vegetables and the like, reciprocable cutting means; a platen rotatable transversely of the cutting means, said platen having a series of openings through which the vegetables are fed to the cutters; and means to intermittently rotate the platen to alternately place an opening therein and a portion of the platen between the openings in line with the cutters, comprising a rotatable pinion, roller carrying studs carried by said pinion diametrically opposite to each other and eccentric to the axis of rotation of the pinion, and radially disposed slots in the platen with which said stud rollers coöperate during the rotation of the pinion.

33. In a cutter for vegetables and the like, a tubular frame carrying blades extending transversely of one end thereof in parallel and spaced relation; a shaft rotatable on a horizontal axis; means to operatively connect the frame to and reciprocate the same from the shaft; a cage engaging in the frame to guide the same, said cage having one end projecting from the frame and provided with slots cut through said end in which the blades slidably engage; a shaft rotatable on a vertical axis driven from the horizontal shaft; a platen rotatably mounted on said shaft to lie contiguous to the slotted end of the cage, said platen having a series of openings through which to feed the vegetable to the cutters in the cage; a pinion rotatable from the vertical shaft having roller carrying studs fixed therein diametrically from each other and eccentric to the axis of rotation of the pinion; and radial slots in the platen with which the stud rollers of the pinion coöperate to intermittently rotate the platen to alternately place an opening therein and a portion between the openings in line with the cage and cutters for the purpose specified.

JOSEPH E. KENNEDY.